Aug. 23, 1932.  J. GOGOL  1,873,640
AUTOMATIC TRACK SANDER AND AIR BRAKE
Filed Oct. 17, 1931  2 Sheets-Sheet 2
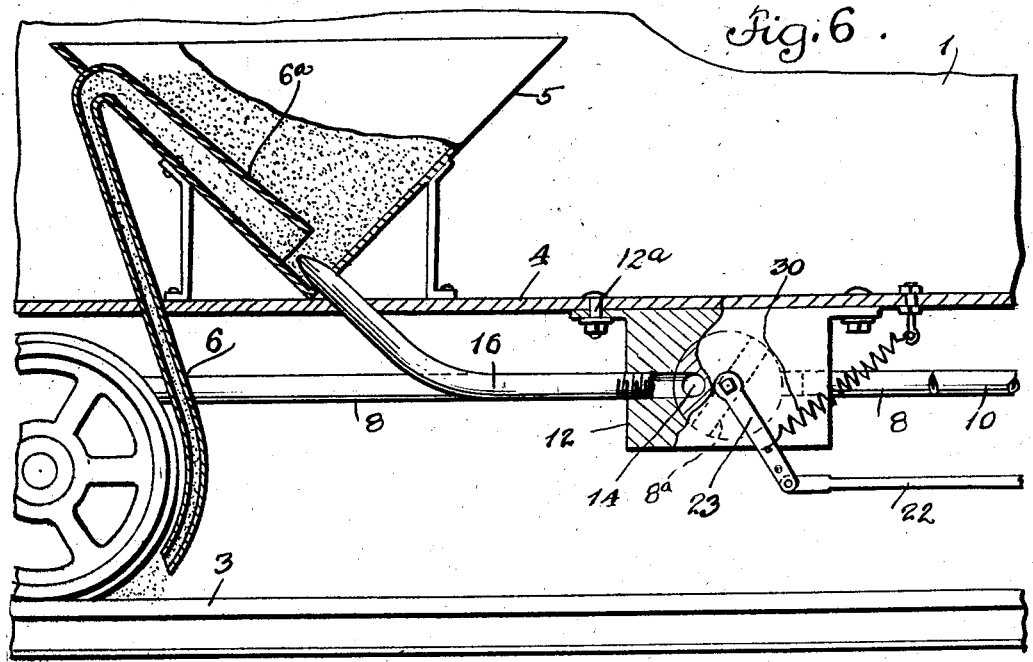
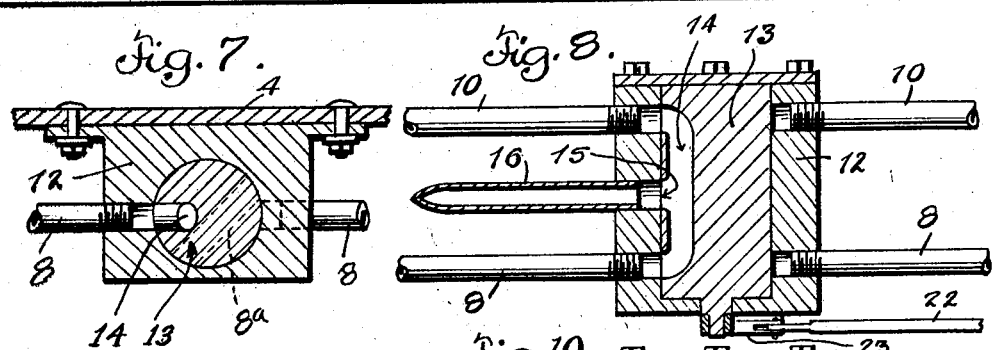
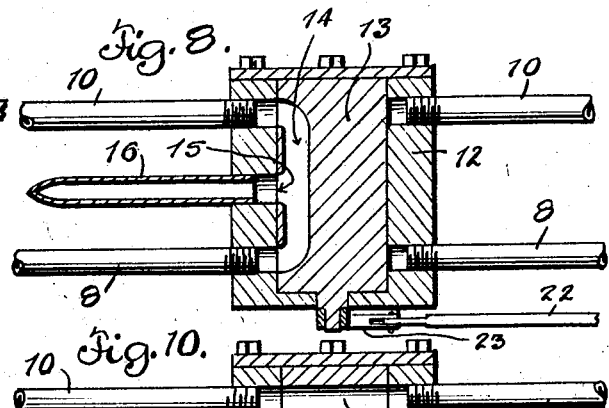
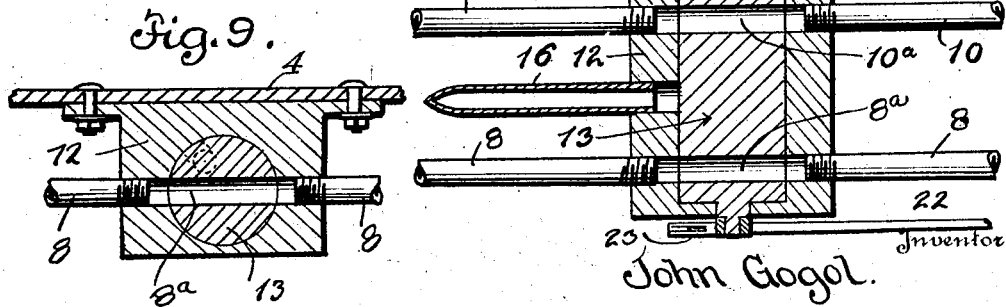
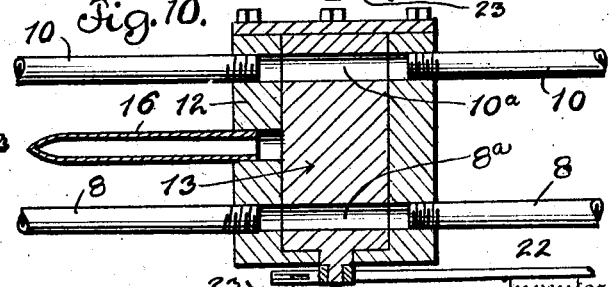

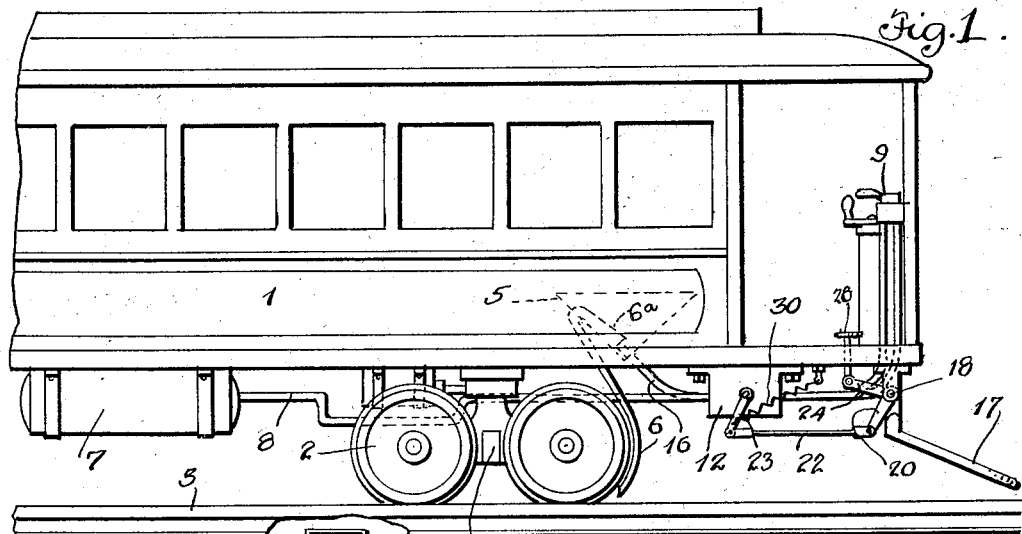

Patented Aug. 23, 1932

1,873,640

UNITED STATES PATENT OFFICE

JOHN GOGOL, OF NORTHAMPTON, MASSACHUSETTS

AUTOMATIC TRACK SANDER AND AIR BRAKE

Application filed October 17, 1931. Serial No. 569,515.

This invention relates to certain new and useful improvements in automatic track sanders and air brakes.

The primary object of the invention is to provide an automatic track sander and air brake for street railway or railroad cars wherein valve mechanism set in the air brake line and in communication with a sand box is operatively engaged with the life guard or fender of the car to be automatically operated when the fender strikes an abutment for the release of air pressure to apply the brakes with a quantity of air in the brake system delivered through the sand box for discharging sand on to the tracks forwardly of the car wheels to aid in bringing the car to a stop and prevent skidding.

A further object of the invention, is to provide an automatic track sander and air brake mechanism of the foregoing character wherein the valve mechanism in the air pipe line may be manually operated by the motorman for the application of the brakes and the sanding of the track rail, it being understood that the usual control valve for operation by the motorman is provided in addition to the emergency valve mechanism.

With the above and other objects in view that will become apparent as the nature of the invention is better understood, the same consists in the novel form, combination and arrangement of parts hereinafter more fully described, shown in the accompanying drawings and claimed.

In the drawings, forming a part of this application and to which reference is had by like characters designating corresponding parts throughout the several views:—

Figure 1 is a fragmentary side elevational view of a car equipped with the automatic track sander and air brake mechanism, Figure 2 is a diagrammatic top plan view showing the emergency valve in communication with the sand box and operatively engaged with the fender, Figure 3 is a detailed sectional view showing the manually operated pedal for restoring the fender to elevated set position and the holding catch engaged with the pedal, Figure 4 is a detailed sectional view showing the link and arm connection attached to the journaled bar of the fender for the operation of the emergency valve, Figure 5 is a detailed sectional view showing the end bracket support for the fender, Figure 6 is a fragmentary vertical longitudinal sectional view showing the sand box in communication with the emergency valve mechanism, Figure 7 is a cross-sectional view of the emergency valve, Figure 8 is a longitudinal sectional view of the emergency valve showing the latter in position for application of the brakes and sanding of the track, Figure 9 is another cross-sectional view of the emergency valve, and Figure 10 is a longitudinal sectional view of the emergency valve showing the same in position for the application of the brakes by the usual valve under the control of the motorman with communicatiton to the sand box cut off.

Referring more in detail to the accompanying drawings, car 1, there are the usual truck wheels 2 that ride upon the rails 3 and as shown in Figure 6, the floor 4 of the car supports a sand box 5 that has a sand delivery pipe 6 extending therefrom and terminating at a point adjacent the rails 3 forwardly of the wheels 2, the end 6ª of the pipe terminating adjacent the lower end of the sand box 5.

The air brake mechanism comprises a compressed air tank 7, having a supply pipe line 8 extending to the motorman's valve 9 with a return or exhaust pipe 10 from the motorman's valve leading to the wheel brake devices 11.

An emergency valve is set into the air supply and return or exhaust pipes 8 and 10 and includes a valve casing 12 supported as at 12ª upon the under side of the car floor 4 and into which casing pipes 8 and 10 extend as illustrated in Figures 7 to 10. A rotary cylindrical valve 13 is mounted in the casing 12 and has cross bores 8ª and 10ª therein that normally register with the air pipes 8 and 10 so that under normal conditions the air supply for the operation of the brakes is controlled by the motorman's valve 9. The valve 13 has a longitudinally extending bore 14 therein that is separated from the cross bores 8ª and 10ª and when the valve 13 is rotated from the position shown in Figure 10 to that shown in Figure 8, the cross bores 8ª and 10ª are disposed at right angles to the pipe lines 8 and 10 and the longitudinal bore 14 in the valve has its ends communicating with the inlet section of the air pipe 8 and the outlet section of the return or exhaust pipe 10. The longitudinally extending bore 14 of the valve 13 has a side outlet 15 intermediate its end that is in communication with a jet pipe 16 carried by the valve casing 12 which extends into the sand box 5 terminating adjacent the open lower end of the sand pipe section 6ª as illustrated in Figure 6.

To accomplish automatic operation of the valve 13, the same is operatively engaged with the life guard or fender 17 that includes a cross shaft 18 journaled in brackets 19 as shown in Figures 1 and 2. An arm 20 is fixed at 21 to the cross shaft 18 of the fender and has a link connection 22 with the lever 23 that is fixed to one end of the rotary valve 13. Another arm 24 that is fixed to the rod 18 as at 25 at one of its ends has its other end pivotally connected as at 26 with a pedal rod 27 extending upwardly through the floor of the car with a pedal head 28 upon its upper end normally disposed adjacent the car floor. When the emergency valve is in the position illustrated in Figures 9 and 10, air under pressure flowing through the pipe 8 and outletting through the pipe 10 to the brake 11 is under control of the motorman's valve 9 for the usual operation of the brake mechanism. Should the fender 17 strike an abutment on the track rails 3, the fender shaft 18 is rotated in the bearings 19, the pedal head 28 automatically elevated, while the arm and link connection 20 and 22 with the lever 23 effects rotation of the valve 13 to move the latter to the position shown in Figure 8 for the automatic application of the brake mechanism without the aid of the motorman and for diverting a portion of the compressed air to the sand box 5 for the sanding of the track rails 3. Sand may also be delivered to the track upon manual elevation of the pedal head 28, whereupon the fender will automatically drop and effect operation of the emergency valve mechanism. The fender 17 is raised to its set position by downward pressure on the pedal rod 27 with the head of the latter thereafter disposed adjacent the car floor. The coil spring 30 normally operates to hold the valve 13 in position in which the bores 8a and 10a are alined with the pipe sections 8 and 10, and aids in elevation of the fender.

While the forms of the invention herein shown and described are what is believed to be the preferred embodiments thereof, it is nevertheless to be understood that various forms, modifications and arrangement of the parts may be made without departing from the spirit and scope of the invention as claimed.

What I claim as new is:—

1. In an automatic track sanding and air brake mechanism, the combination with an air brake system, of track sending means including a valve device interposed in the air line of the air brake system, a pivotally supported car fender and operative connections between the fender and track sand means.

2. In automatic track sanding and air brake mechanism, the combination with an aid brake system, of track sanding means including a valve device interposed in the air line of the air brake system, and a sand box in connection with the valve device having a sand delivery pipe extending therefrom, a pivotally supported car fender and operative connections between the fender and track sand means.

3. In automatic track sanding and air brake mechanism, the combination with an air brake system, of track sanding means including a valve device interposed in the air line of the air brake system, the valve device including a casing with which the air supply and exhaust pipe lines communicate, a rotary valve therein controlling flow through the pipe lines, and a by-pass in the rotary valve to divert the air in the supply pipe line direct to the brakes and track sanding means.

4. In automatic track sanding and air brake mechanism, the combination with an air brake system, of track sanding means including a valve device interposed in the air line of the air brake system, and a sand box in connection with the valve device having a sand delivery pipe extending therefrom, the valve device including a casing with which the air supply and exhaust pipe lines communicate, a rotary valve therein controlling flow through the pipe lines, and a by-pass in the rotary valve to divert the air in the supply pipe line direct to the brakes and track sanding means.

5. In automatic track sanding and air brake mechanism, the combination with an air brake system, of track sanding means including a valve device interposed in the air line of the air brake system, a pivotally supported car fender and operative connections between the fender and track sand means, the valve device including a casing with which the air supply and exhaust pipe lines communicate, a rotary valve therein controlling flow through the pipe lines, and a by-pass in the rotary valve to divert the air in the supply pipe line direct to the brakes and track sanding means.

6. In automatic track sanding and air brake mechanism, the combination with an air brake system, of track sanding means including a valve device interposed in the air line of the air brake system, and a sand box in connection with the valve device having a sand delivery pipe extending therefrom, a pivotally supported car fender and operative connections between the fender and track sand means, the valve device including a casing with which the air supply and exhaust pipe lines communicate, a rotary valve therein controlling flow through the pipe lines, and a by-pass in the rotary valve to divert the air in the supply pipe line direct to the brakes and track sanding means.

7. In automatic track sanding and air brake mechanism, the combination with an air brake system, of track sanding means including a valve device interposed in the air line of the air brake system, a pivotally supported car fender and operative connections between the fender and track sand means, the valve device including a casing with which the air supply and exhaust pipe lines communicate, a rotary valve therein controlling flow through the pipe lines, and a by-pass in the rotary valve to divert the air in the supply pipe line direct to the brakes and track sanding means, and manually operable means for rendering the valve device operative.

8. In automatic track sanding and air brake mechanism, the combination with an air brake system, of track sanding means including a valve device interposed in the air line of the air brake system, and a sand box in connection with the valve device having a sand delivery pipe extending therefrom, a pivotally supported car fender and operative connections between the fender and track sand means, the valve device including a casing with which the air supply and exhaust pipe lines communicate, a rotary valve therein controlling flow through the pipe lines, and a by-pass in the rotary valve to divert the air in the supply pipe line direct to the brakes and track sanding means, and manually operable means for rendering the valve device operative.

In testimony whereof I affix my signature.

JOHN GOGOL.